C. SANDS.
KETTLE TILTER AND COVER HOLDER.
APPLICATION FILED FEB. 21, 1921.
1,410,128.
Patented Mar. 21, 1922.
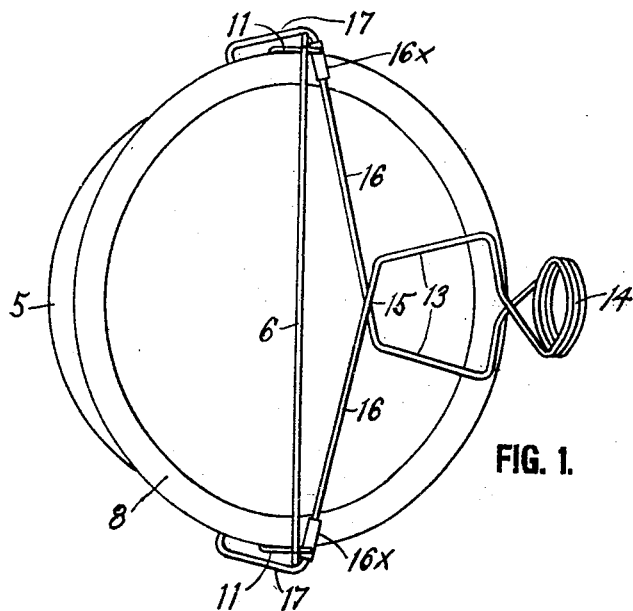
FIG. 1.
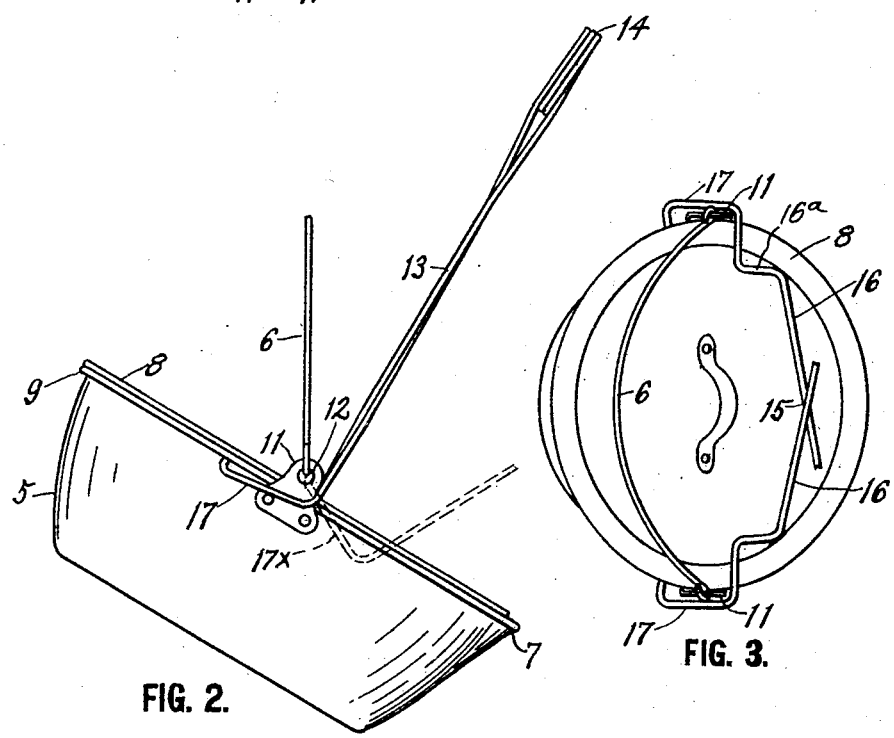
FIG. 2.
FIG. 3.
Inventor
Charles Sands
By A. M. Carlsen,
Attorney

UNITED STATES PATENT OFFICE.

CHARLES SANDS, OF KENYON, MINNESOTA.

KETTLE TILTER AND COVER HOLDER.

1,410,128.     Specification of Letters Patent.     Patented Mar. 21, 1922.

Application filed February 21, 1921. Serial No. 446,548.

*To all whom it may concern:*

Be it known that I, CHARLES SANDS, a citizen of the United States, residing at Kenyon, in the county of Goodhue and State of Minnesota, have invented new and useful Kettle Tilters and Cover Holders, of which the following is a specification.

My invention relates to devices for tipping or tilting a cooking kettle in pouring liquid from it especially without removing the cover of the kettle.

In the accompanying drawing:

Fig. 1 is a top view of a cooking vessel of the type having a bail and showing my device applied to it.

Fig. 2 is a side elevation of Fig. 1 showing the kettle partly tilted and a slight modification indicated.

Fig. 3 is a top view showing how the device may be modified so as to make it fit small as well as large kettles.

Referring to the drawing by reference numerals, 5 designates a kettle having a bail 6, a spout 7 and a cover 8, and it may or may not have the external top rim 9. The ears 11 for the bail 6 may be secured on the kettle or cast integral with it, but in either case if the rim 9 is absent the ears 11 should have their holes 12 extra large so as to leave room not only for the ends of the bail but also for my device to engage therein instead of under the rim.

My device is composed of a pair of loose wire arms 13 forming the handle of the device having their upper ends united by a spring coil 14, which tend to spread the handle, but as the lower portions of the handle wires or bars cross each other loosely at 15 and form oppositely extended arms 16 with hooks 17 it is obvious that the spreading of the handle causes said hooks to close toward the opposite sides of the kettle and thus engage either under the rim 9 or in the apertures of the ears as the dotted hook 17$^x$ in Fig. 2.

In the operation or use of the device after the device is engaged with the kettle as just described, the operator allows the handle bars to spread and thereby the hooks to engage; he may also aid the engaging of the hooks by a spreading pressure at the handle bars 13. He now grasps the bail 6 in one hand and with the other hand on the handle 13 he leans the latter away from the bail until the kettle has been tilted to the desired incline and thus the desired contents poured out of it, meanwhile the cover 8, if present is held on the kettle by the contact with it of the arms 16 near the hooks 17.

If the device is intended also for small kettles I offset the arms 16 inward as at 16$^a$ in Fig. 3 so as to prevent their passing outside the top edge of the kettle.

In Fig. 1 I have shown a collar 16$^x$ of any suitable pliant material slipped on to bail arms 16 and placed so as it will help hold kettle cover in place.

What I claim is:—

1. A kettle tilting device comprising a handle formed of two bars attached together at their upper ends and having means tending to normally spread the lower ends of the bars, loosely crossed oppositely directed arms extending rigidly from the lower ends of the handle bars and provided with a hook arranged to take against the opposite outer sides of the kettle, while the arms adjacent the hooks engage upon the top edge of the kettle.

2. The structure specified in claim 1, said arms of the device having near the hooks each an inward offset to enable it to engage the top of small sized kettles.

In testimony whereof I affix my signature.

CHARLES SANDS.